(12) United States Patent
Kerr et al.

(10) Patent No.: US 10,810,252 B2
(45) Date of Patent: Oct. 20, 2020

(54) SEARCHING USING SPECIFIC ATTRIBUTES FOUND IN IMAGES

(71) Applicant: ADOBE INC., San Jose, CA (US)

(72) Inventors: Bernard James Kerr, Sausalito, CA (US); Zhe Lin, Fremont, CA (US); Patrick Reynolds, San Francisco, CA (US); Baldo Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 232 days.

(21) Appl. No.: 15/002,179

(22) Filed: Jan. 20, 2016

(65) Prior Publication Data

US 2017/0097948 A1 Apr. 6, 2017

Related U.S. Application Data

(60) Provisional application No. 62/236,648, filed on Oct. 2, 2015.

(51) Int. Cl.
| | |
|---|---|
| *G06F 17/00* | (2019.01) |
| *G06F 7/00* | (2006.01) |
| *G06F 16/532* | (2019.01) |
| *G06F 16/56* | (2019.01) |
| *G06F 16/583* | (2019.01) |

(Continued)

(52) U.S. Cl.
CPC .......... *G06F 16/532* (2019.01); *G06F 3/0482* (2013.01); *G06F 3/04842* (2013.01); *G06F 16/56* (2019.01); *G06F 16/583* (2019.01); *G06F 16/5838* (2019.01); *G06N 3/08* (2013.01); *G06N 5/022* (2013.01)

(58) Field of Classification Search
USPC ......................................................... 707/722
See application file for complete search history.

(56) References Cited

U.S. PATENT DOCUMENTS 5,467,441 A 11/1995 Stone
5,802,361 A * 9/1998 Wang .................. G06F 16/7335
382/217

(Continued)

FOREIGN PATENT DOCUMENTS

AU 2016210606 8/2016
AU 2016210608 8/2016

(Continued)

OTHER PUBLICATIONS

Abbreviated Examination Report dated Jan. 12, 2017 in GB Patent Application No. 1612864.7. 6 pages.

(Continued)

*Primary Examiner* — Pavan Mamillapalli
(74) *Attorney, Agent, or Firm* — Shook, Hardy & Bacon L.L.P.

(57) ABSTRACT

In various implementations, specific attributes found in images can be used in a visual-based search. Utilizing machine learning, deep neural networks, and other computer vision techniques, attributes of images, such as color, composition, font, style, and texture can be extracted from a given image. A user can then select a specific attribute from a sample image the user is searching for and the search can be refined to focus on that specific attribute from the sample image. In some embodiments, the search includes specific attributes from more than one image.

20 Claims, 7 Drawing Sheets

(51) Int. Cl.
*G06N 3/08* (2006.01)
*G06F 3/0482* (2013.01)
*G06F 3/0484* (2013.01)
*G06N 5/02* (2006.01)

(56) References Cited

U.S. PATENT DOCUMENTS

| | | | | |
|---|---|---|---|---|
| 6,173,275 B1* | 1/2001 | Caid | .................. | G06F 16/58 706/14 |
| 6,574,378 B1* | 6/2003 | Lim | .................. | G06F 16/5854 382/305 |
| 6,704,725 B1* | 3/2004 | Lee | .................. | G06K 9/64 382/305 |
| 7,912,291 B2* | 3/2011 | Berkner | .............. | G06F 16/5838 382/190 |
| 9,158,970 B2* | 10/2015 | Zhang | ................ | G06K 9/00288 |
| 9,176,748 B2 | 11/2015 | Hanson | | |
| 9,317,534 B2* | 4/2016 | Brandt | .................. | G06F 16/54 |
| 9,367,765 B2* | 6/2016 | Duckett | .............. | G06K 9/6263 |
| 2002/0052803 A1* | 5/2002 | Amidhozour | ...... | G06F 17/30259 705/14.51 |
| 2002/0138481 A1* | 9/2002 | Aggarwal | .............. | G06Q 30/02 707/999.006 |
| 2002/0181783 A1* | 12/2002 | Shiiyama | .......... | G06F 17/30247 382/217 |
| 2005/0002568 A1* | 1/2005 | Chupeau | .............. | G06K 9/6211 382/190 |
| 2007/0286528 A1* | 12/2007 | Podilchuk | ........... | G06F 16/7837 382/305 |
| 2007/0288453 A1* | 12/2007 | Podilchuk | ........... | G06F 16/5854 707/999.005 |
| 2011/0025694 A1* | 2/2011 | Ptucha | ................... | G06T 11/60 345/467 |
| 2011/0314052 A1* | 12/2011 | Francis | ................ | G06F 16/904 707/769 |
| 2013/0195361 A1* | 8/2013 | Deng | ................... | G06F 16/5838 382/195 |
| 2013/0282712 A1* | 10/2013 | Brandt | .............. | G06F 17/30277 707/731 |
| 2014/0019431 A1* | 1/2014 | Suleyman | ............. | G06F 16/532 707/706 |
| 2014/0140625 A1* | 5/2014 | Zhang | ................. | G06K 9/00677 382/195 |
| 2014/0180832 A1* | 6/2014 | Fox | .................... | G06O 30/0275 705/14.71 |
| 2015/0154229 A1* | 6/2015 | An | ........................ | G06F 16/583 707/728 |
| 2016/0154862 A1* | 6/2016 | Gabbai | .............. | G06Q 30/0241 707/722 |
| 2016/0239711 A1* | 8/2016 | Gong | .................... | G06F 16/735 |

FOREIGN PATENT DOCUMENTS

| | | |
|---|---|---|
| CN | 106560810 | 9/2016 |
| CN | 106560809 | 4/2017 |
| DE | 1 2016 010 744.8 | 9/2016 |
| DE | 10 2016 010 868.1 | 9/2016 |
| GB | 2542891 | 7/2016 |
| GB | 2542890 | 4/2017 |

OTHER PUBLICATIONS

First Action Interview Office Action dated Apr. 10, 2019 in U.S. Appl. No. 15/002,172, 8 pages.
First Action Interview Pre-Interview Communication dated Nov. 29, 2018 in U.S. Appl. No. 15/002,172, 6 pages.
Notice of Allowance in U.S. Appl. No. 15/002,172 dated Jun. 12, 2020.

* cited by examiner

FIG. 2

SEARCHING USING SPECIFIC ATTRIBUTES FOUND IN IMAGES

CROSS-REFERENCE TO RELATED APPLICATIONS

This application claims the benefit of U.S. Provisional Application No. 62/236,648, filed Oct. 2, 2015, entitled "Searching Using One or More Specific Attributes Found In One Or More Images," the benefit of priority of which is hereby claimed, and which is incorporated by reference herein in its entirety.

BACKGROUND

Internet-based search engines traditionally employ common image search techniques for locating digital image content on the World Wide Web. These well-known image search techniques can be categorized into "text-based" image searches and "visual-based" image searches.

Traditional text-based image searches may receive a text-based query used for searching a database having keyword-tagged images to generate a resulting set of images that each has one or more keyword tags matching the text-based query. These text-based searches rely primarily on the quality of the keyword tags associated with an image, while ignoring the image's visual information. Traditional visual-based image searches, on the other hand, may receive an image as a visual-based query for searching a database of images, irrespective of the each image having keyword tags associated therewith, to generate a resulting set of images that each has visually similar characteristics to the visual-based query image.

While traditional image search techniques can generate tolerable results, the generation of quality results in text-based image searches may depend on the level of detail of the keyword tags in the image database on which the search is conducted. For example, a text-based image search can only produce desirable results if the database on which the search is performed includes keyword-tagged images. In this regard, if an image database comprised, among many other images, thousands of images of couples on a beach at sunset, none of which had a keyword tag associated with keywords "couple," "sunset" or "beach," a text-based image search with a text-based query (e.g., a descriptive keyword) of "couple beach sunset" would not generate any desirable results.

With particular regards to visual-based image searches, the generation of quality results may depend on the quality, or even the existence of, the visual-based search query itself. For example, a visual-based image search can only generate desirable results if provided with a visual-based query (e.g., an exemplary image) that is similar in all attributes to a desired image. In this regard, if a user wanted to search the image database to locate images similar to an image of a couple on a beach at sunset, the user would need to have at least one image having visually similar characteristics to the images in the image database to construct the search query. Such a search, however, may have unintended consequences. For example, the visual-based image search may identify images that include some similar attributes to the search query based on an overall similarity but not the specific attributes that were most important to the user. Continuing the example above, assume the user wants to find images with color (or some other attribute, such as composition, style, texture, font, etc.) similar to the image of the couple on the beach at sunset, but does not care what content is in the image. Current visual-based image searches may return many images which include similar content as well as attributes that are not desired. Moreover, these searches may ignore or miss many images which included the desired attribute(s). As such, traditional image search techniques can be rather restrictive and limited in scope.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to using one or more specific attributes found in one or more images in a visual-based search. More specifically, in embodiments of the present invention, a user can search for images based on the selected visual properties (i.e., attributes) of one or more images submitted as a query. Utilizing machine learning, deep neural networks, and other computer vision techniques, attributes of images, such as color, composition, font, style, and texture can be extracted from a given image. A user can then select a specific attribute from a sample image the user is searching for and the search can be refined to focus on that specific attribute from the sample image. For example, a user may be searching for images that have a similar texture to the sample image but is not interested in other aspects of the sample image, such as color or composition. The search can then focus on finding images with similar texture without searching for images with similar color or composition. In some embodiments, the search includes specific attributes from more than one image. In this way, the search is able to focus on one specific attribute, such as color, from a first image and a different specific attribute, such as composition, from a second image.

BRIEF DESCRIPTION OF THE DRAWINGS

The present invention is described in detail below with reference to the attached drawing figures, wherein:

FIGS. 2-3 illustrate exemplary graphical user interfaces for searching using one or more specific attributes found in one or more images, in accordance with implementations of the present disclosure;

DETAILED DESCRIPTION

Figure 1:
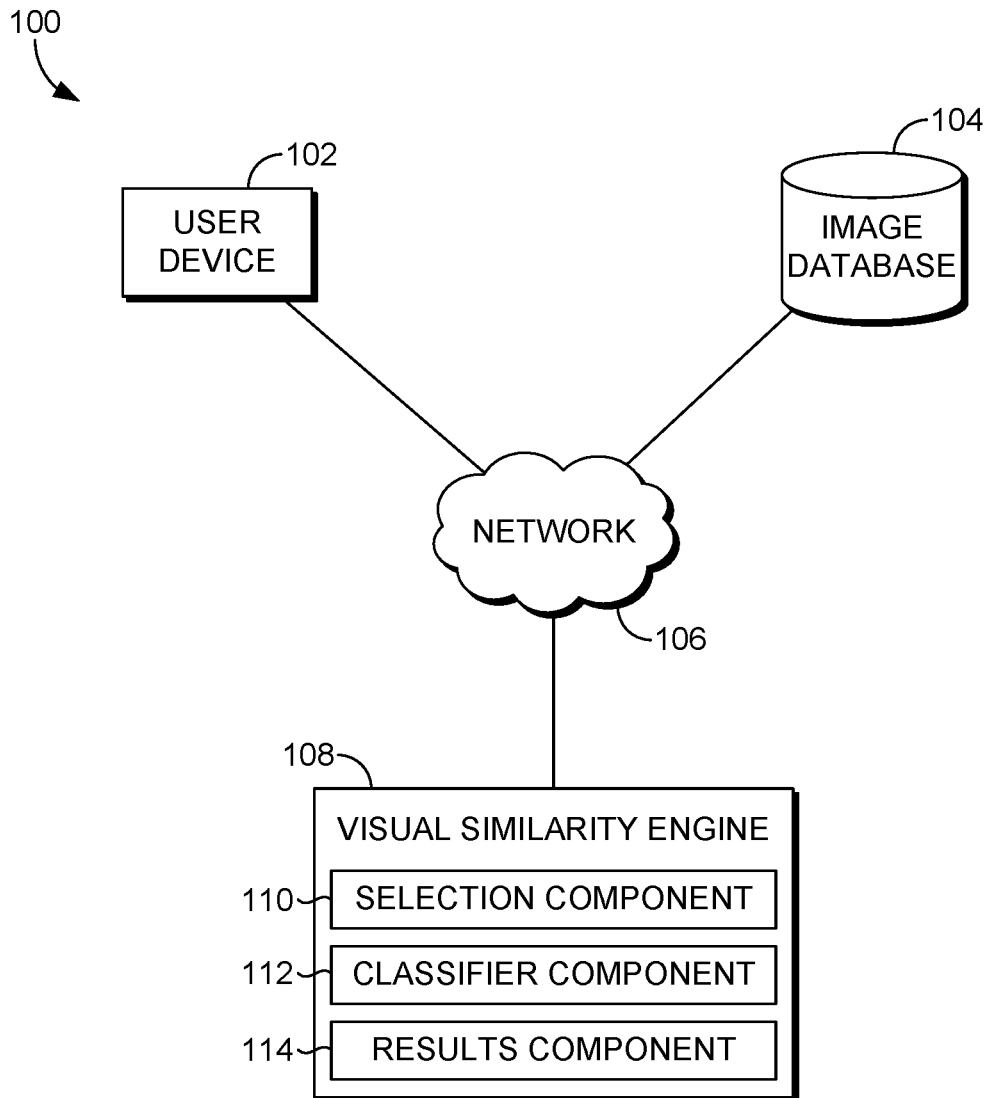
FIG. 1 is a diagram illustrating an exemplary system in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Conventional image search engines, employed in local or networked environments including the World Wide Web, can generate image search results based on one of text queries or visual queries. Text-based image search engines typically receive a text-based query (i.e., "red ball," "football game," "tiger in cage") that is used to query a tagged image database, wherein each image in the database is tagged with at least one keyword (e.g., "red," "ball," "football," "game," "tiger," "cage") describing characteristics associated with the image. Typically, images are previously tagged with keywords describing the visual characteristics of the image. If one or more tagged images are determined to have at least one keyword associated therewith that corresponds to the text-based query, the image(s) is returned as a search result(s) in response to the text-based query. As used herein, the term "tag" is used to refer to metadata that is included in or otherwise associated with an image and that describes or otherwise indicates some attribute of the image. For example, a tag may include, among other things, descriptions of subject matter depicted in the image, author of the image, editor of the image, time periods associated with the image, or locations associated with or depicted in the image. Natural language processing may also be utilized in text-based image searches.

Visual-based image search engines, on the other hand, typically receive a visual-based query (i.e., an image of a red ball, an image of a football game, an image of a tiger in a cage) that is used to query an image database, irrespective of the images having tags associated therewith. In other words, the images in the database can be tagged, untagged, or both. By employing an image analyzing algorithm configured to compare (1) visual information associated with the visual-based query, with (2) visual information associated with each image in the database, search results can be generated that have substantially similar visual characteristics to the visual-based query. Current visual-based image searches do not allow a user to select specific low level attributes from a particular image that the user is actually interested in finding in other images. As a result, although current visual-based image searches may identify images that include some similar attributes to the search query based on an overall similarity, they may ignored the specific attributes that were most important to the user. Accordingly, current visual-based image searches may return many images which include similar content, but also additional attributes that are not desired. More simply, these searches may ignore or miss many images which included the desired attribute(s).

As such, embodiments of the present invention are directed to using one or more specific attributes found in one or more images in a visual-based search. As described in more detail herein, a user can employ the search system to search for images based on user selected visual properties (i.e., specific attributes) of one or more images. This enables the user to focus the search on finding images that include the specific attributes the user desires. Although described with reference to image searches, it is contemplated that the techniques utilized in implementations of the present disclosure could be applied to music and video searches as well. For example, given one or more songs (or videos), the user may be able to select attributes (e.g., tempo, voice, style, genre, performer, etc.) that have been selected for each song (or video), to search for other songs (or videos) that have the selected attributes.

To do so, machine learning, deep neural networks, and other computer vision techniques are utilized to extract attributes of images, for example as a feature vector. In various embodiments, the attributes include color, composition, font, style, and texture. Attributes may also include line weight or line style. Training images may be utilized to implement a generic system initially that identifies visual similarity generally, but without any understanding of specific attributes. The generic system may then be trained with a new set of training data for a specific attribute. In this way, the system may be fine-tuned at different output layers to detect different attributes with each layer being independently evolved from the generic system. In other words, the transformations necessary to extract a particular feature vector at a particular layer of the system is learned based on set of training data for each specific attribute.

A database can include tagged, untagged, or a combination of tagged and untagged images. Image tags can include any keyword for describing visual characteristics associated with an image. For example, an image of fireworks behind the Eiffel tower on Bastille Day can have image tags, among others, "Eiffel," "tower," "fireworks," "Paris," and/or "Bastille Day" associated therewith. Irrespective of the images in the database having any tags associated therewith, a visual-based query can be received for searching the images in the database. As will be used herein, the term "database" is not necessarily limited to a storage database, but can also refer to a collection, catalog, folder, storage location, network location, library, or the like.

The visual-based search can be configured for local operation (e.g., part of the personal asset management application or the local operating system), remote access (e.g., part of a cloud-based asset management application), or publicly accessible over the Internet (e.g., part of a web image search engine). It is contemplated that access to any of the aforementioned can be limited by user-based access restrictions. For instance, the local or remote access configurations can be limited to a user having access to a particular set of images (e.g., local access being limited to user account, or the remote access being limited to the user's cloud storage space). It is also contemplated, that any combination of the local, remote, or Internet-based configurations can be employed to process the visual-based query.

Upon training the system to extract attributes from an image, a user can submit a sample image comprising at least one desired attribute. A user can then select a specific attribute of the sample image to focus on that specific attribute from the sample image. In one example, a user may be searching for images that have a similar texture to the sample image but is not interested in other aspects of the sample image, such as color or composition. The search can then focus on finding images with similar texture without searching for images with similar color or composition. In some embodiments, the search includes specific attributes from more than one image. In this way, the search is able to focus on one specific attribute, such as color, from a first image and a different specific attribute, such as composition, from a second image.

Some embodiments of the present invention are directed to modifying one or more specific attributes found in an image. To do so, a user may submit a first sample image comprising a number of attributes. The user may submit a second sample image that comprises at least one attribute that is different from the attributes of the first sample image. Upon selecting one or more attributes from the second image, the user may modify at least one attribute extracted from the first sample image based on the selection. This enables a user to modify an image to include a desired attribute that is not inherent to the image without having to perform a search for images that include all of the desired attributes. In some embodiments, the user may submit a search query based on the modified image.

As used herein, visual similarity refers to similarity between purely visual characteristics of two or more images. Visual similarity between two or more images can be determined by employing a direct image comparison algorithm executed by one or more processing devices. The image comparison algorithm identifying one or more graphical similarities between visual characteristics of two or more images. For example, by comparing image color data, arrangement of image pixel data, image size, and/or other visual image data characteristics associated with the images, the direct image comparison algorithm can determine, among other things, a visual similarity score between two or more images. In essence, the image comparison algorithm can analyze image data associated with two or more separate images to determine that the images are visually similar. For example, the direct image comparison algorithm may determine that two separate images, each having the Eiffel tower isolated front and center, as having a high likelihood of visual similarity. The direct image comparison algorithm may also look, however, at two separate images, one having the Eiffel tower isolated, front and center, the other having an image of a dog front and center with the Eiffel tower offset and in the background, as not having a high likelihood of visual similarity.

Visual similarity can also be determined through a semantic similarity analysis. As used herein, the term "semantic similarity" refers to similarity between aspects of image content that are visible to a user. In some embodiments, semantic similarity includes a similarity between a first set of shapes and spatial relationships in a first image and a second set of shapes and spatial relationships in a second image. In one example, an image of a person's face has a higher semantic similarity to an image of another person and a lower semantic similarity to an image of a building. In another example, an image of two people standing close together has a higher semantic similarity to an image of a crowd of people and a lower semantic similarity to an image of a single person. In additional or alternative embodiments, semantic similarity includes a similarity between a first image style in a first image and a second image style in a second image. For example, vectors representing color or contrast information can be calculated for two images. The stylistic similarity can be determined by calculating a distance between these vectors. A larger calculated distance indicates a lower degree of stylistic similarity, and a smaller calculated distance indicates a higher degree of stylistic similarity.

Semantic similarity can be determined between two or more images by employing a neural network or other feature extraction algorithm executed by one or more processing devices. The network or algorithm can identify one or more associations between the semantic content of an image and a class of semantically similar images. For example, a neural network or other feature extraction algorithm may analyze training images with certain recurring objects, color schemes, or other semantic content and determine that the objects, color schemes, or other semantic content are indicative of a certain class of content (e.g., "dogs," "vehicles," "trees," etc.). The neural network or other feature extraction algorithm may apply the learned associations between different classes and different types of semantic content to classify subsequently received images. An example of a classifier algorithm is an algorithm that uses a neural network model to identify associations between certain semantic features and certain classes of semantic content. As such, using the Eiffel tower example above, the neural network or classifier algorithm may look at the two separate images, one having the Eiffel tower isolated, front and center, the other having an image of a dog front and center with the Eiffel tower offset and in the background, as having at least some semantic similarity (i.e., both having the Eiffel tower depicted within the image).

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client only system or a client-server system that can be utilized to facilitate text-based image searching of untagged images. Among other components not shown, the system 100 can include one or more user devices 102, network 106, one or more visual similarity engines 108, and one or more image databases 104. Although illustrated as including a visual similarity engine 108 and an image database 104, embodiments can include both, one or the other, or neither. It should be understood that any number of servers and client devices may be employed within system 100 within the scope of the present disclosure. Each may comprise a single device or multiple devices cooperating in a distributed environment. In some embodiments, the system 100 may reside locally on a single device. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 800, later described with reference to FIG. 8, for example. The components may communicate with each other via network 106.

Network 106 may be wired, wireless, or both. Network 106 may include multiple networks, or a network of networks, but is shown in simple form so as not to obscure aspects of the present disclosure. By way of example, network 106 can include one or more wide area networks (WANs), one or more local area networks (LANs), one or more public networks, such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

In various implementations, user device 102 is a computing device that is capable of accessing the Internet, such as the World Wide Web. User device 102 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

User device 102 can include one or more processors, and one or more computer-readable media. The computer-readable media may include computer-readable instructions executable by the one or more processors. The instructions may correspond to one or more applications, such as a web browser or other application capable of initiating a visual-based search. The user device 102 can be configured to store, among other things, content such as images. The images can be stored, for instance, on one or more computer-readable media.

In various implementations, image content can be on the user device 102, visual similarity engine 108, image database 104, or any combination thereof. Further, other components of the system 100 not specifically shown may include portions and/or segments of image content. For example, system 100 may include various forms of cache(s), storage device(s), and/or database(s) that may assist in storing image content for and providing image content to user device 102.

Visual similarity engine 108 is generally configured to provide a publicly accessible image search service (e.g., Adobe® Fotolia®, Adobe® Behanced®, Google® Images, Bing® Images, Yahoo!® Image Search) for hosting and providing an image search engine for searching content, such as image database 104 for a user device, such as user device 102. As a specific example, visual similarity engine 108 can receive a visual-based query from the user device 102. The visual similarity engine can then process the visual-based query to locate images having, among other things, images comprising at least one of the specified attributes by searching one or more image databases hosted in association with the visual similarity engine 108 or by searching the World Wide Web. The visual similarity engine 108 can then return, to the user device 102, at least a portion of the set of result images as an image results set.

In accordance with embodiments described herein, the visual similarity engine 108 can include a selection component 110, a classifier component 112, and a results component 114. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, one or more of the illustrated components/modules may be implemented as stand-alone applications. In other embodiments, one or more of the illustrated components/modules may be integrated directly into the operating system of the visual similarity engine 108. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the visual similarity engine 108 might reside on a server, cluster of servers, or a computing device remote from or integrated with one or more of the remaining components.

The visual similarity engine 108 may be any type of computing device, or incorporated into a computing device, that can access a network (e.g., network 106). For instance, the visual similarity engine 108 may be a desktop computer, a laptop computer, a tablet computer, a mobile device, a server, or any other device, or portion thereof, having network access. Generally, a user may employ the visual similarity engine 108 via the user device 102 to, among other things, utilize one or more attributes from one or more images to identify visually similar images comprising the one or more attributes and/or modify a first image with attributes from a second image.

In some embodiments, the user may employ the visual similarity engine 108 via the user device 102 to extract the attributes of an image, select the attributes of interest, and search a collection of images based on the selected attributes. For example, a user may have an image of two people walking on a beach with a sunset in the background. The image may have very vibrant color and may have a grainy texture. The user may initially utilize the visual similarity engine 108 to extract these attributes from the image. A user interface may show each of these attributes of the image along with a sample or preview of images with similar attributes. The user may select the attributes of interest, for example, composition (i.e., two people walking on the beach with a sunset in the background) and color (i.e., vibrant colors). In this example, the user may not like the texture (i.e., grainy) of the image and wants to find images with similar composition and color but not texture. Upon selecting the attributes of interest, the visual similarity engine 108 provides an image results set to the user via the user device 102. The image results set comprises one or more result images from the image database 104 that includes similar attributes to the selected attributes of interest.

As previously mentioned, in embodiments, the visual similarity engine 108 includes a selection component 110, a classifier component 112, and a results component 114 to facilitate searching utilizing one or more attributes from one or more images. Generally, to search utilizing one or more attributes from one or more images, several preliminary steps are performed on a collection of images. First, classifier component 112 is generally configured to implement a generic neural network or other feature extraction algorithm to identify similar images. Next, the classifier component fine-tunes the neural network or other feature extraction algorithm with a new set of training data at each layer to identify specific attributes. Each layer is independently evolved from the generic neural network or other feature extraction algorithm.

In some embodiments, each image in the image database 104 is classified at each fine-tuned layer of the neural network or other feature extraction algorithm so that each image is associated with a feature vector for each attribute. In some embodiments, the images are clustered or grouped in accordance with individual attributes to provide more efficient searches. In some embodiments, the neural networks or other feature extraction algorithms are independent of each other and trained offline (i.e., for each attribute to train its own feature extractor). When a user wishes to perform a search utilizing the visual similarity engine 108, the user may select or provide one or more images to the visual similarity engine 108. The classifier component 112 extracts attributes from the image(s) and identifies one or more images that have similar attributes. In some embodiments, a nearest neighbor classifier is utilized to determine the most similar images for each separate attribute.

In some embodiments, visual similarity engine 108 includes or has access to a database of descriptors that have references to the images in the image database 104. In this way, the images may be retrieved from the database 104 via the network 106 only when they are needed, such as when they are responsive to a user search and need to be presented to the user via the user device 102.

In implementation, a user initially submits an image to the visual similarity engine 108 via a user device 102. The image may be stored locally on the user device 102, stored remotely on an image database 104, or reside on some other remote location. In some embodiments, the user device may include a camera that has captured the image. The image is provided to the neural network or other feature extraction algorithm to identify attributes associated with the image. In some embodiments, a search preview is provided to the user that includes images comprising each individual attribute comprised by the image. For example, the search preview may include images with similar composition, similar texture, similar font, similar color, and/or similar style. The search preview may include images derived from a full search of an image database, may only include the images with attributes most similar to the image (such as may be identified by a nearest neighbor classifier algorithm for each particular attribute), or from a smaller subset of sample images.

In some embodiments, more than one image may be submitted to the visual similarity engine 108. Attributes for each of the images are identified by the neural network or other feature extraction algorithm. In this way, the search preview may include images with similar composition, similar texture, similar font, similar color, and/or similar style for each submitted image.

The selection component 110 is generally configured to receive a selection of one or more attributes of interest to include in an image search. In this way, the user may select each low level attribute that the user is interested in for a particular image(s) to submit as an image-based search query. In some embodiments, the user may select one or more attributes from a single submitted image. In some embodiments, the user may select one or more attributes from multiple submitted images. In some embodiments, the user may select one or more images provided in the search preview to submit as a search query. In some embodiments, the user may crop an image to focus a query on a specific part of the image. In some embodiments, the user may clone or copy one part of the image so that the search identifies images with two of those parts instead of one. For example, if an image has one cat, but the user wants to identify images with two cats, the user can clone the cat in the image and apply the search to look for images with two cats. Similarly, in some embodiments, the user may copy and paste elements (e.g., paste a sailboat into an image of a beach) to or remove elements from an image (e.g., remove a person from a forest scene) and search utilizing the edited image. Such editing may be accomplished, for example, using tools that may be embedded into the system 100.

The selection component 110 is also configured, in some embodiments, to receive a selection of one or more attributes from a model image (i.e., an image provided in the search preview or another image submitted by a user). For example, the user may submit an image that includes one or more attributes that the user would like to replace with attributes from another image, such as an image provided in the search preview or another image that is submitted by the user. The user may select the attribute(s) from the search preview or the other image and the image may be modified in accordance with the selected attribute.

In some embodiments, the selection component 110 may also be configured to receive a text-based query to supplement the visual-based search query. The text-based query can comprise any combination of characters that can identify a desired characteristic depicted or associated with a result image. For instance, the text-based query can include keywords (i.e., dominant colors appearing in the image, objects or people depicted in the image, authors/dates/locations associated with the image, etc.). As an example, if a user provided search parameter "Eiffel tower and fireworks", the text query would comprise precisely the term "Eiffel tower and fireworks." In some embodiments, the text-based query can reformat the terms of the text query to comply with operands associated with the search algorithm. For example, if Boolean operators were supported by the text-based search algorithm, the text-based query could be reformatted to "Eiffel" OR "tower" AND "fireworks." In some embodiments, the text-based query utilizes natural language. For example, the query "black and white photos of cats" may identify "cats" as the keywords and "black and white" and "photos" as attributes of the image. Variations of such operations are well-known in the art and are considered within the scope of the present invention.

As described above, the classifier component 112 is generally configured to classify or extract attributes of an image(s) submitted by the user. To do so, the classifier component 112 may implement machine learning, deep neural networks, and other computer vision techniques. The classifier component 112 is also configured to receive the search query from selection component 110 and perform the image search. Classifier component 112 may perform the search by implementing the same machine learning, deep neural networks, and other computer vision techniques, such as the neural network or other feature extraction algorithm described above, to extract attributes from a set of images, such as image database 104. In some embodiments, the set of images may include images stored by visual similarity engine 108, images local to the user device 102, or any images stored remotely that may be accessible to visual similarity engine 108 or user device 102 via the network 106.

Results component 114 is generally configured to provide search results to the user via the user device 102. The search results may be a search results preview. The search results preview comprises one or more images that are responsive to the visual-based query (e.g., images that correspond to each of the one or more attributes extracted from the submitted image(s)). In some embodiments, the user may select an attribute of the submitted image or an image from the search preview to initiate a full search query. By providing a search preview, the visual similarity engine 108 may preserve resources (i.e., memory, processing time, etc.)

of the visual similarity engine 108 and the user device 102. Once the user makes the additional selection, a full search may be performed and the results component 114 may provide a full set of results in accordance with the selections.

Classifier component 112 may classify images based on each individual selection received by selection component 110. Results component 114 may then identify the images in the results set based on an average score across all selections. In some embodiments, selection component 110 may receive weights selected by a user that indicate the importance of one attribute over another. Accordingly, results component 114 may rank the images in the results set based on the selected weights. In some embodiments, classifier component 112 may first rank the search results based on a first selected attribute, and then rerank the search results based on additional selected attributes. This may enable the user to identify the most important attribute, with each additional selected attribute causing the search results to be reranked based on the additional selected attributes (but still maintaining the same image result set without identifying new images not identified based on the search for the most important attribute). Although described with specificity herein, the described embodiments are merely exemplary and not intended to be limiting, as the aggregating and ranking of the visual-based search query can be performed in a variety of configurations.

In some embodiments, results component 114 is configure to apply selected attributes from an image to a submitted image. As described above, the user may submit an image to visual similarity engine 108. Assuming the image has an attribute the user wishes to replace, the user may select an attribute from another image (such as another submitted image or an image in the search preview or search results) which may then be received by selection component 110. Results component 114 may apply the selected attributes to the image which results in a modified image. The user may then use the modified image, in some embodiments, to perform an additional search by submitting the modified image to the visual similarity engine 108.

In one example, all instances of a friend appearing in photographs on a mobile device camera roll may be identified. When a new photograph is captured of that friend, such as by the camera on the mobile device, the new picture may be utilized as a query to identify all other photographs of that friend (with or without the person being identified with a text label). In this way, face recognition may be utilized as an attribute for the search query.

Figure 2:
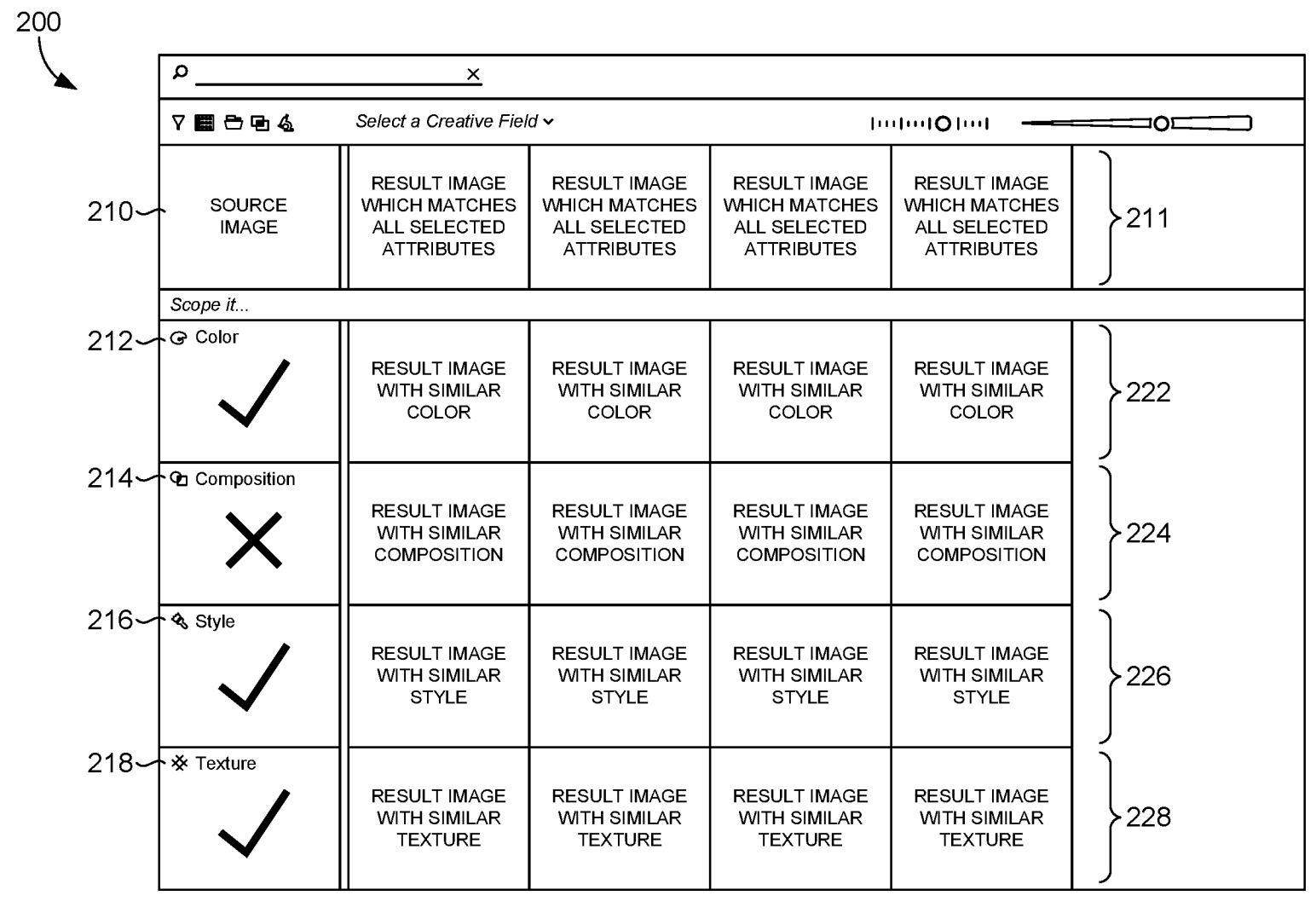

Referring to FIG. 2, an exemplary graphical user interface 200 for searching using one or more specific attributes found an image is illustrated, in accordance with implementations of the present disclosure. As shown in interface 200, a source image 210 has been submitted by a user. Attributes 212, 214, 216, 218 of the image 210 are provided along with a search results preview 222, 224, 226, 228 for each attribute 212, 214, 216, 218. As described herein, the search results preview may be a limited sample of results based on a search that is not performed against an entire image set (to preserve resources and maximize efficiency of the computing devices). In some embodiments, the search results preview is the results set based on a search that is performed against the entire image set (e.g., an image database). The user may select a particular attribute(s) of the source image to initiate a full image search or may select one or more images from the search results preview to initiate the full image search. Once the user has made the desired selections, a full set of search results may be provided by interface 200 to the user. In some embodiments, no search results preview is provided and the user may make selection based on the attributes of the source image 210 and initiate the search accordingly. As illustrated, the user has selected attributes 212, 216, 218 and has not selected attribute 214. In this way a search will be initiated that identifies result images 211 having attributes 212, 216, and 218 that are similar to the same attributes of the source image 210.

Figure 3:
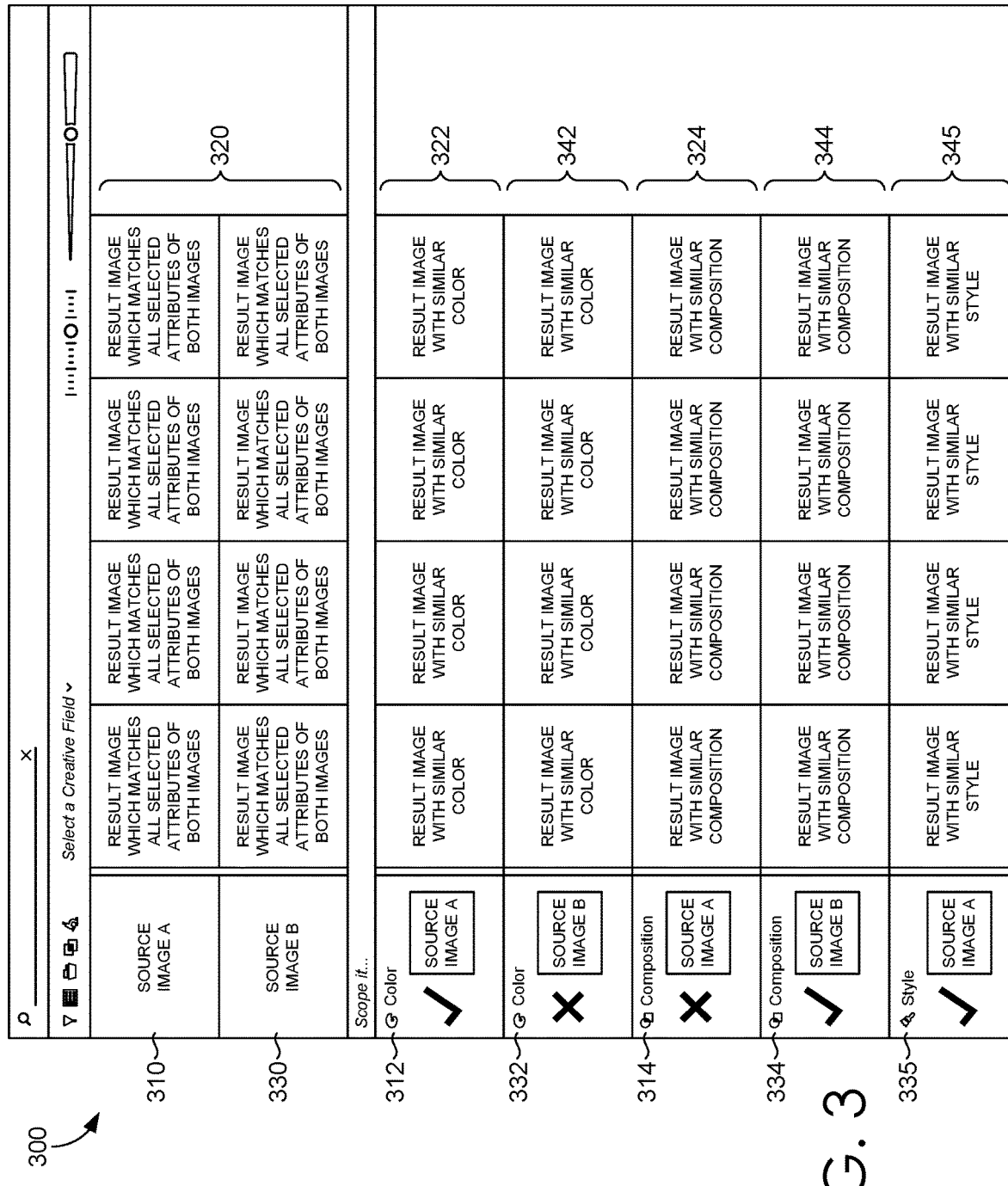

Turning now to FIG. 3, an exemplary graphical user interface 300 for searching using one or more specific attributes found in one or more images is illustrated, in accordance with implementations of the present disclosure. As shown in interface 300, two or more source images 310, 330 may be submitted by a user. Similar to the interface illustrated in FIG. 2, attributes 312, 332, 314, 334 are provided along with a search results preview 322, 342, 324, 344 for each attribute 312, 332, 314, 334 for each image 310, 330. This allows the user to select a particular attribute(s) from each of the source images to initiate an image search. In some embodiments, the user may select one or more images form the search results preview to initiate the images search. Once the user has made the desired selections, a full set of search results may be provided by interface 300 to the user. As illustrated, the user has selected attributes 312, 335 from source image 310. The user has also selected attribute 334 from source image 330. However, the user has not selected attribute 332 from source image 330 or attribute 314 from source image 310. In this way a search will be initiated that identifies result images 320 having attributes 312, 335 that are similar to the same attributes of source image 310 as well as attribute 334 that is similar to the same attribute of source image 330.

Figure 4:
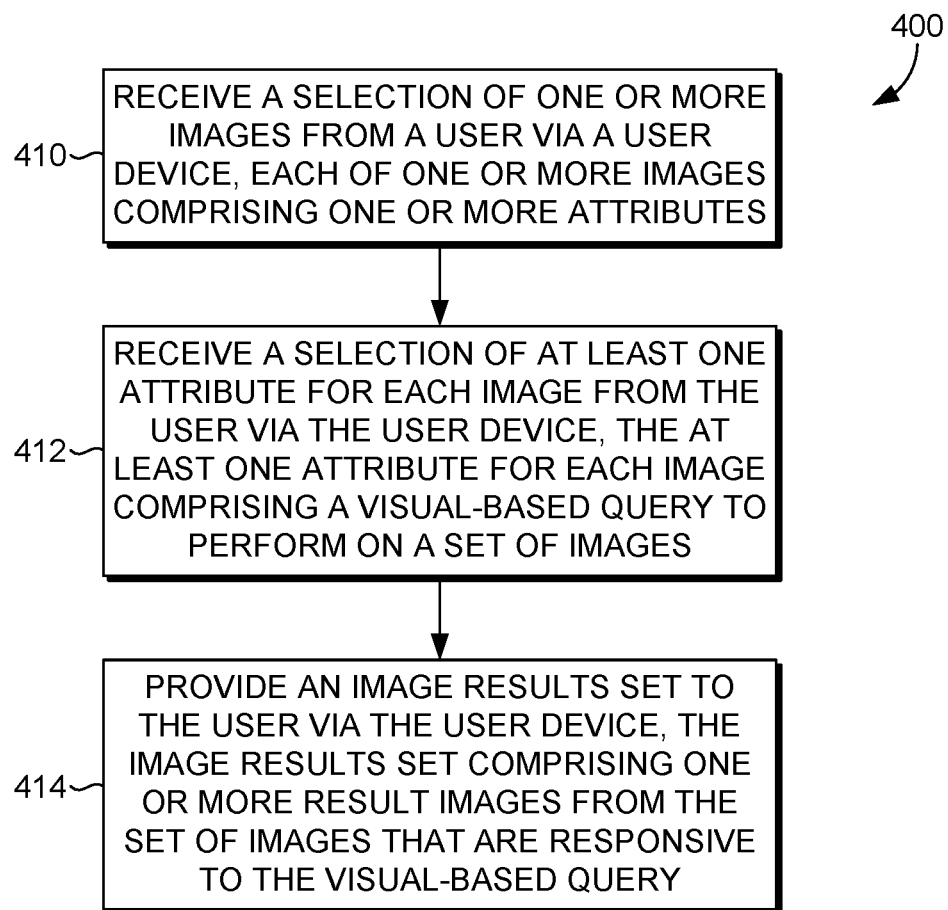
FIGS. 4-5 are flow diagrams showing methods for searching using one or more specific attributes found in one or more images, in accordance with implementations of the present disclosure.

In FIG. 4, a flow diagram showing a method 400 for searching using one or more specific attributes found in one or more images, in accordance with implementations of the present disclosure, is provided. Each step of method 400 and other methods described herein comprises a computing process that may be performed using any combination of hardware, firmware, and/or software, such as those described herein. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At step 410, a selection of one or more images from a user via a user device is received. Each of one or more images comprises one or more attributes that may be identified, in embodiments, by a neural network or other feature extraction algorithm. The neural network or other feature extraction algorithm may compare feature vectors corresponding visual-based query to feature vectors in the set of images to identify image results based on visual similarity. In some embodiments, the attributes include one or more of composition, color, style, texture, or font. A selection of at least one attribute for each image is received, at step 412, from the user via the user device. Each selection may additionally include a weight selected by a user that may indicate an importance of each attribute to the user. In some embodiments, a negative attribute may be selected for one or more images that indicates an attribute the user does not want the result images to include. For example, the user may desire to find images that does not include a particular color, composition, or style that are identified in the received image. The user may select each of these undesired items (e.g., the negative attributes) and a query will exclude items from the results that include the negative attributes. Each selection comprises at least a portion of a visual-based query to perform on a set of images.

An image results set is provided, at step 414, to the user via the user device. The image results set comprises one or more result images from the set of images that are responsive to the visual-based query. In embodiments, a selection of a result image is received from the user via the user device. In addition, a selection of at least one refined attribute may be received from the user via the user device. The refined attributed is an attribute of the selected result image. In this way, the user may refine the search query in accordance with the refined attributes and the image results set may be updated for the user via the user device. The updated image results set comprise one or more result images from the set of images that are responsive to the refined visual-based query.

Figure 5:
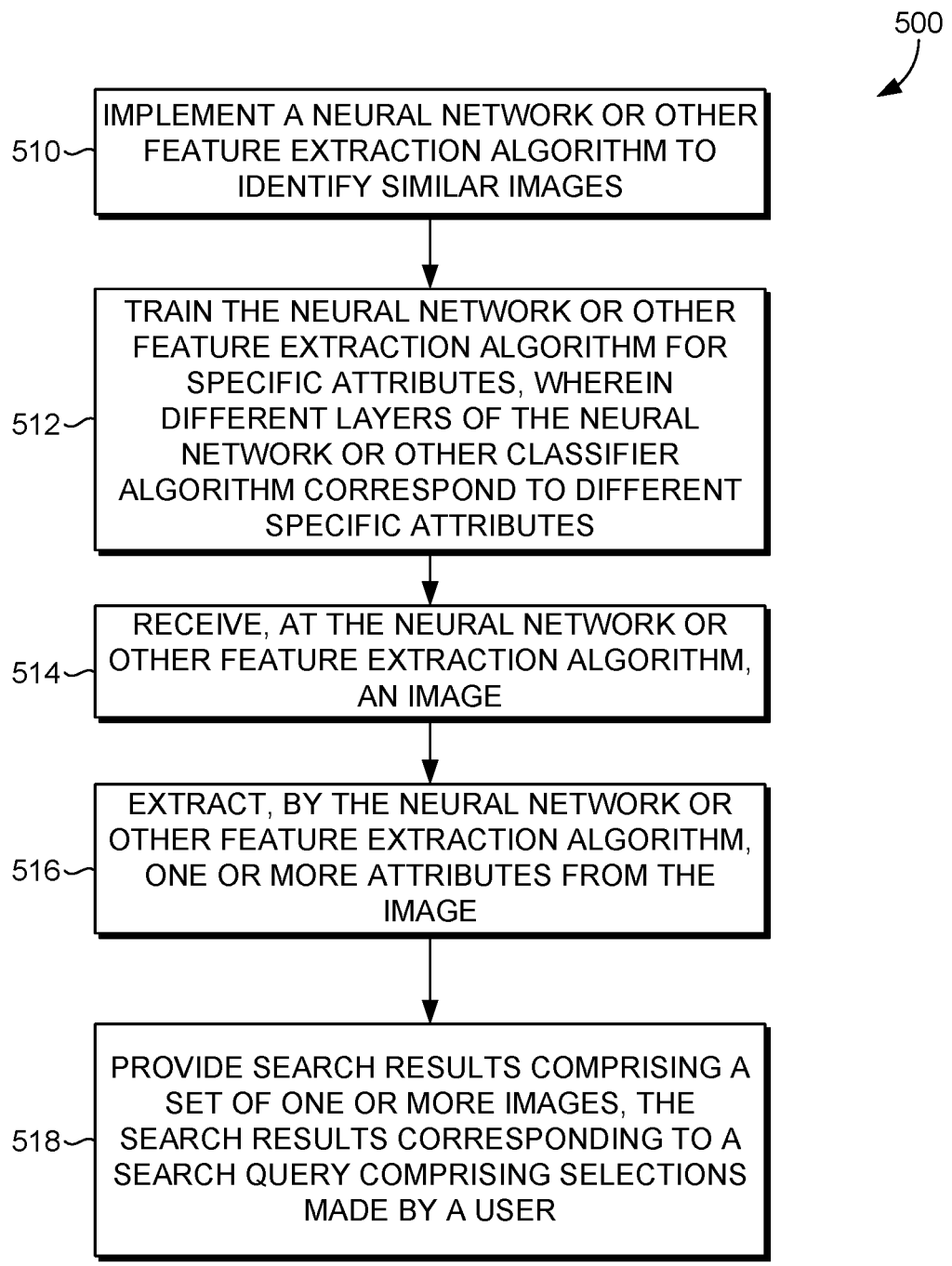

Turning now to FIG. 5 a flow diagram showing a method 500 for searching using one or more specific attributes found in one or more images, in accordance with implementations of the present disclosure, is provided. Initially, at step 510, a neural network or other feature extraction algorithm is implemented to identify similar images. The neural network or other feature extraction algorithm is trained at step 512, for specific attributes. In some embodiments, the attributes include one or more of composition, color, style, texture, or font. In some embodiments, different layers of the neural network or other feature extraction algorithm correspond to different specific attributes. In this way, the same a neural network or other feature extraction algorithm can be utilized to extract each type of attribute.

An image is received, at step 514, at the neural network or other feature extraction algorithm. The neural network or other feature extraction algorithm extracts, at step 516, one or more attributes from the image. Search results comprising a set of one or more images are provided, at step 518. The search results correspond to a search query comprising selections made by a user. In some embodiments, the selections comprise at least one of the one or more attributes of the image. In some embodiments, the selections comprise at least one of the one or more attributes of the image and a text-based query. In some embodiments, the selections comprise at least one of the one or more attributes of the image and a user-provided sketch. In this way, the user may modify an attribute of the image by sketching directly on the image. In some embodiments, additional tools may be provided to the user allowing the user to modify attributes of the image. In some embodiments, the selections comprise other image attributes that have been stored in an image database (e.g., size, orientation, color, vector, date, location, illustration, and the like). Any number of image attributes that can be utilized to classify an image may be stored in the image database and utilized in the search query.

In some embodiments, a second image is received at the neural network or other feature extraction algorithm. The neural network or other feature extraction algorithm may extract one or more attributes from the second image. In some embodiments, the selections comprise at least one of the one or more attributes from each image (the first and second image). As can be appreciated, any number of images may be submitted and any number of attributes may be selected from each submitted image. In some embodiments, a selection of a search result and at least one attribute extracted by the neural network or other feature extraction algorithm is received. Refined search results may be provided to the user based on the selection.

Figure 6:
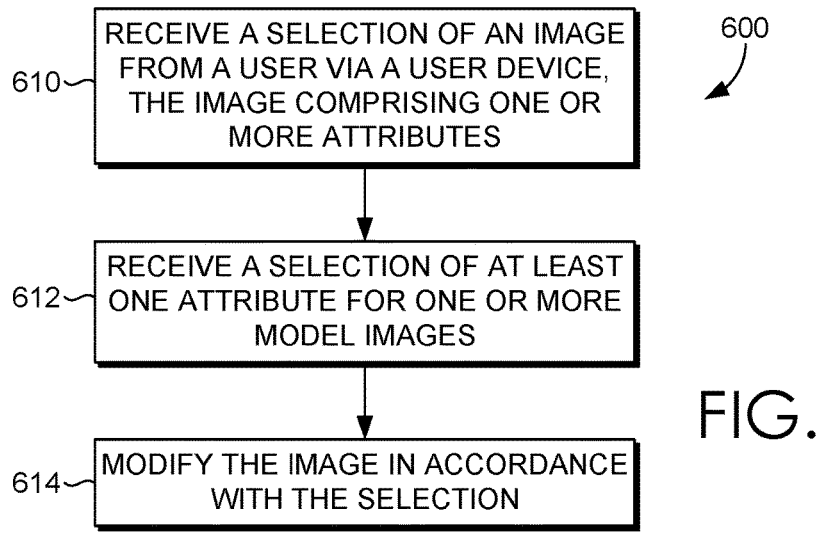
FIGS. 6-7 are flow diagrams showing methods for modifying at least one attribute of an image that can be utilized for search, in accordance with implementations of the present disclosure.

Referring to FIG. 6 a flow diagram showing a method 600 for modifying at least one attribute of an image that can be utilized for search, in accordance with implementations of the present disclosure, is provided. Initially, at step 610, a selection of an image is received from a user via a user device. The image comprises one or more attributes that may be extracted utilizing a neural network or other feature extraction algorithm. In some embodiments, the attributes include one or more of composition, color, style, texture, or font. At step 612, a selection of at least one attribute is received for one or more model images. In an embodiment, a selection of a weight for each attribute is received from a user. In some embodiments, a selection of at least one negative attribute is received from the user. The negative attribute(s) is an attribute the user does not want the modified image to include. The model image(s) may be provided in a search results preview, as described herein, in a search results set, as described herein, or may be submitted by a user. At least one attribute of the image is modified, at step 614, in accordance with the selection.

In some embodiments, a search preview comprising a set of one or more images is provided. The set of one or more images are determined by a neural network or other feature extraction algorithm to be visually similar to the image and comprises the at least one attribute that was modified. A selection of an image in the set of one or more images may be received and a search query may be initiated based on the selection.

Figure 7:
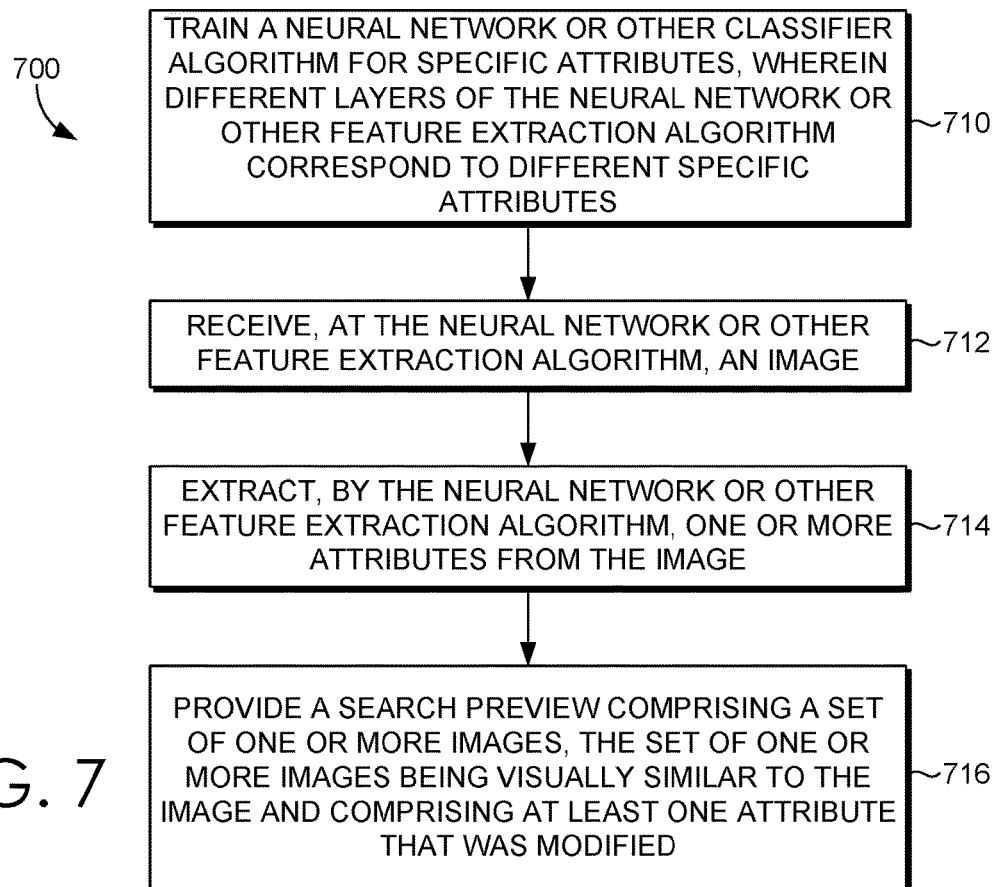

In FIG. 7 a flow diagram showing a method 700 for modifying at least one attribute of an image that can be utilized for search, in accordance with implementations of the present disclosure, is provided. Initially, at step 710, a neural network or other feature extraction algorithm is trained for specific attributes. In this regard, different layers of the neural network or other feature extraction algorithm correspond to different specific attributes. In embodiments, the attributes include one or more of composition, color, style, texture, or font. An image is received, at step 712, and processed by the neural network or other feature extraction algorithm. One or more attributes are extracted from the image, at step 714, by the neural network or other feature extraction algorithm.

In some embodiments, other images are received at the neural network or other feature extraction algorithm. One or more attributes from the other images may be extracted by the neural network or other feature extraction algorithm. The one or more attributes extracted from the other images may be utilized to modify at least one attribute of the image. In some embodiments, attributes of the image may be modified in accordance with text-based attributes of other images. In some embodiments, attributes of the image may be modified in accordance with a user-provided sketch.

A search preview comprising a set of one or more images is provided, at step 716. The set of one or more images are determined by the neural network or other feature extraction algorithm to be visually similar to the image and comprise at least one attribute that was modified. In some embodiments, a selection of an image in the set of one or more images may be received. A search query may be initiated that is based on the selection. Refined search results based on the selection may be provided.

Figure 8:
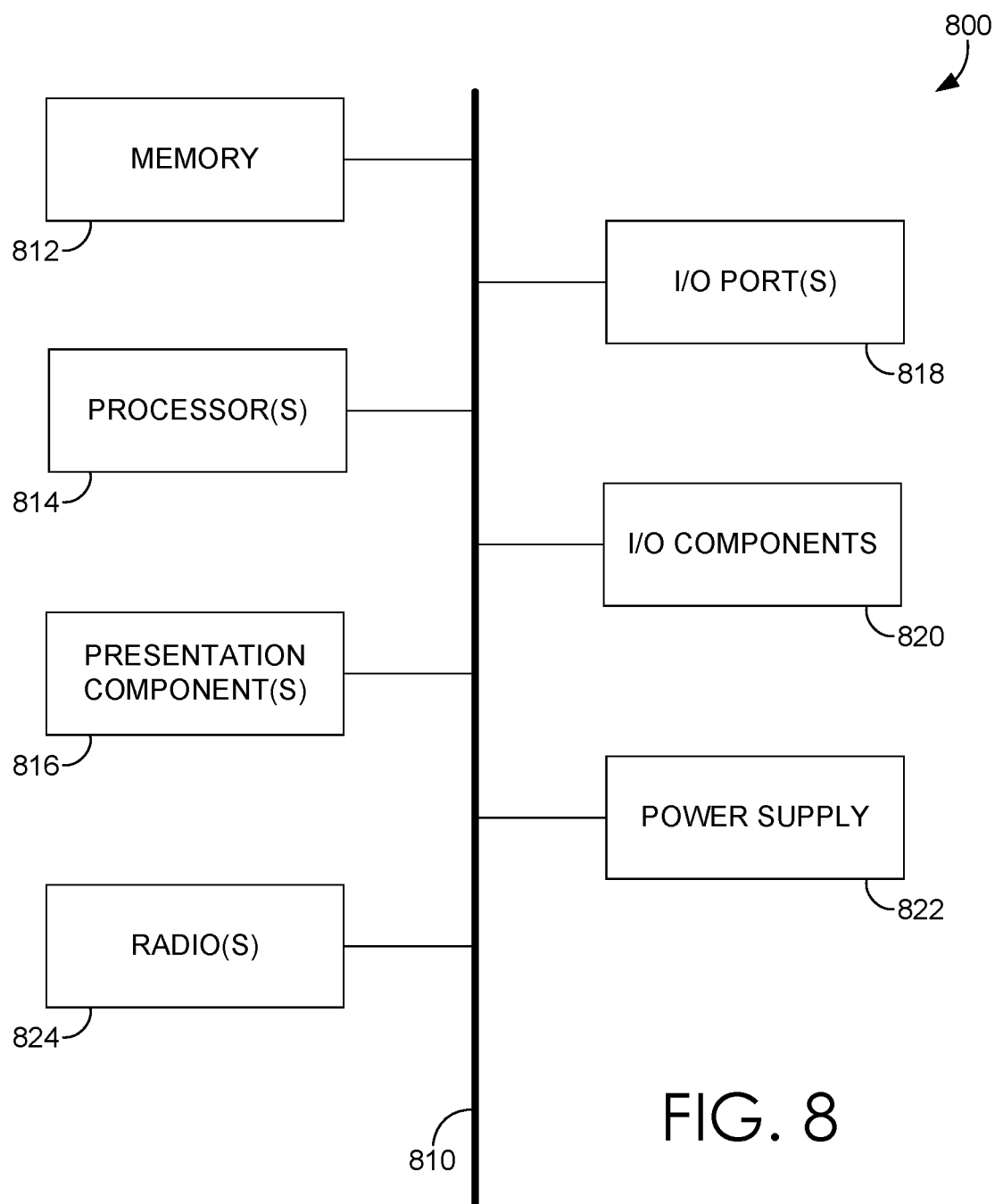
FIG. 8 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," "smart phone," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As described above, implementations of the present disclosure facilitate searching using one or more specific attributes found in one or more images. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. Non-transitory computer storage media storing computer-useable instructions that, when used by a computing device, cause the computing device to perform operations comprising:

receiving a source image;
extracting, via a neural network, a plurality of visual attributes from the source image;
presenting a user interface with indications of the plurality of extracted visual attributes of the source image, wherein each of the indications of the plurality of extracted visual attributes are presented separately and concurrently with one or more images having a visual attribute corresponding to at least one of the indicated extracted visual attributes;
receiving, via the user interface, a selection of at least one extracted visual attribute from the indicated plurality of extracted visual attributes from the source image;
initiating a query configured to search a set of images, based on the at least one extracted visual attribute selected from the source image, to generate an image results set, wherein the image results set is comprised of result images with a visual attribute that matches the at least one extracted visual attribute selected; and
providing, via the user interface, the image results set based on the query.

2. The media of claim 1, wherein the initiated query is further configured to search the set of images based on the first selection and a second selection, the second selection indicating at least one extracted visual attribute from a second source image.

3. The media of claim 1, the operations further comprising:
receiving a weight for each extracted visual attribute selected; and
conducting the query based on the weight for each selected visual attribute-selected.

4. The media of claim 1, the operations further comprising:
receiving an indication to exclude at least one extracted visual attribute selected from the plurality of visual attributes; and
excluding a plurality of images from the image results set based on the indication.

5. The media of claim 1, the operations further comprising:
modifying the at least one extracted visual attribute selected to include a desired visual attribute, wherein the desired visual attribute is not extracted from the source image; and
initiating the query based on the modified extracted visual attribute selected.

6. The media of claim 5, the operations further comprising:
receiving a selection of at least one refined visual attribute of a result image from the image results set.

7. The media of claim 6, the operations further comprising:
refining the query in accordance with the at least one refined visual attribute of the result image; and
updating the image results set, the updated image results set including refined result images from the set of images that are responsive to the refined query.

8. The media of claim 1, the operations further comprising:
comparing, based on a feature extraction algorithm, a first set of feature vectors corresponding to visual attributes of the source image to a second set of feature vectors corresponding to visual attributes of a different image in the set of images; and
updating the image results set based on a correspondence between the first and second set of feature vectors.

9. A computer-implemented method, comprising:
extracting a visual attribute from a source image;
presenting, via a user interface, the source image concurrently with both a first indication of the extracted visual attribute and a second indication of a sample image being retrieved based on the extracted visual attribute; and
providing search results from a set of images responsive to a query based on a selection of the first indication or the second indication.

10. The method of claim 9, wherein the visual attribute includes one or more of composition, color, style, texture, or font.

11. The method of claim 10, wherein the sample image is a first image, and the visual attribute is a first attribute; and the method further comprising:
concurrently presenting the first indication of the first attribute with a third indication of a second attribute extracted from the source image; and
receiving another selection to exclude the second attribute from the search results.

12. The method of claim 9, further comprising:
extracting a second attribute from a second source image; and
concurrently presenting the first indication of the visual attribute and a third indication of the second attribute from the second source image.

13. The method of claim 12, further comprising:
receiving, via the user interface, another selection of the third indication of the second attribute from the second source image; and
refining the query based on the another selection.

14. The method of claim 12, further comprising:
receiving, via the user interface, another selection to exclude the second attribute from the second source image;
refining the query based on the another selection.

15. The method of claim 9, further comprising:
receiving another selection of a result image among the search results and at least one attribute extracted from the result image.

16. The method of claim 15, further comprising:
providing refined search results based on the another selection.

17. The method of claim 9, further comprising:
presenting, via the user interface, another attribute of the source image and a preview image, wherein the preview image and the source image share a commonality on the another attribute.

18. The method of claim 17, further comprising:
retrieving the preview image based on the commonality on the another attribute.

19. A computerized system comprising:
a processor; and
computer storage media storing computer-usable instructions that, when used by the processor, cause the processor to:
extract a plurality of visual attributes from a first source image and a second source image;
receive a first selection of a first representation of the first source image, wherein the first representation corresponds to a first visual attribute of the plurality of visual attributes;
receive a second selection of a second representation of the second source image, wherein the second representation corresponds to a second visual attribute of the plurality of visual attributes; and provide, via a user interface, a search result comprising images responsive to a search query based on a combination of the first selection and the second selection.

20. The computerized system of claim 19, wherein the instructions further cause the processor to cause a concurrent display of the first representation of the first source image and a third representation of the second source image, wherein both the first representation of the first source image and the third representation of the second source image correspond to the first visual attribute of the plurality of visual attributes.

* * * * *